March 3, 1953  J. G. IMPARATO  2,629,910
DRUM RING CLAMP
Filed April 9, 1949
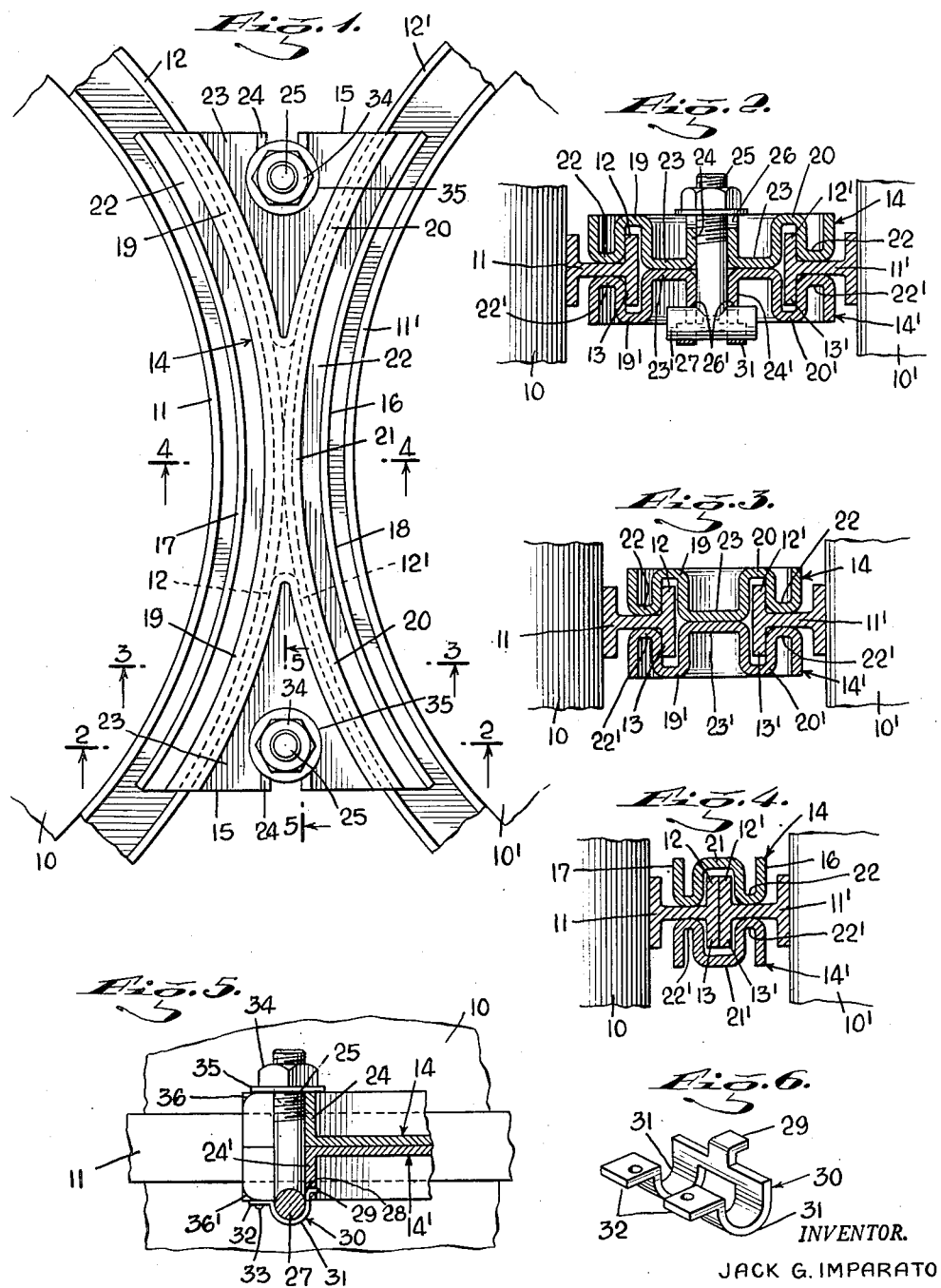
INVENTOR.
JACK G. IMPARATO
BY
Howard E. Thompson
ATTORNEY Patented Mar. 3, 1953

2,629,910

UNITED STATES PATENT OFFICE 2,629,910

DRUM RING CLAMP

Jack G. Imparato, Brooklyn, N. Y.

Application April 9, 1949, Serial No. 86,569

3 Claims. (Cl. 24—81)

This invention relates to the provision of a clamp for use in coupling a multiplicity of drums having circumferential rings on the wall structure thereof to maintain the drums in assembled relationship to each other and against shifting when stored as cargo on board ships, and particularly on the decks of ships. More particularly, the invention deals with a clamp comprising two similar clamp plates grooved to engage the flanges of the drum rings, with means for securing the plates together and to said rings. Still more particularly, the invention deals with a clamp of the class described wherein the clamp plate securing means comprises bolts having a pivotal or swinging mounting in connection with one of the plates, and maintained in coupled engagement therewith to simplify coupling assemblage of the plates.

The novel features of the invention will be best understood from the following descriptions when taken together with the accompanying drawing, in which certain embodiments of the invention are disclosed, and in which the separate parts are designated by suitable reference characters in each of the views; and in which:

Fig. 1 is a plan view of a portion of a pair of drums, showing part of the peripheral rings and illustrating one of my improved clamps mounted thereon.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a section on the line 5—5 of Fig. 1; and

Fig. 6 is a perspective view of a bolt holding member, detached.

In the shipment of cargo of the type and kind under consideration, namely drums, having on the surface thereof circumferential rings for protection of the drums, and to reinforce and strengthen the same, considerable expense has been involved to erection of structures on the decks of ships, to maintain a group or cluster of such drums in definite position on the deck, so as to prevent shifting or displacement of such cargo. This constructive means has run into considerable expenditure and requires erection at the time of placing the cargo and disassemblage in the operation of removing the cargo, and in most instances, the means employed for holding the drums in position is lost, and many man-hours of labor are required to perform the respective operations.

It is the purpose of my invention to provide a simple clamp to directly couple adjacent drums of a nesting of drums, positioned on a ship in the manner above stated, so that when the nesting of drums are coupled together, the entire nesting of drums on the deck of a ship will become actually a single unit, which as such, will prevent any possible shifting or displacement of the nested drums contained in the unit. Furthermore, clamps of the type and kind under consideration can be quickly and easily applied, as well as detached, and the clamps can be used indefinitely, thus affecting a material saving in continued or repeated shipments of cargo of the kind under consideration.

In the accompanying drawing, I have shown a single clamp coupling adjacent portions of two drums. It will be understood, however, that in the use of the clamps, the same will be disposed on all adjacent surfaces of drums as they may be nested on the deck of a ship. In other words, all of the inside drums of a nesting will have clamps on four sides of each drum, whereas outer drums of a nesting will have clamps on two or three sides, depending upon their positions in the nesting, as well as the manner of nesting.

In the drawing, I have shown somewhat diagrammatically, one adaptation of the invention, and in Figs. 1 to 3 inclusive, I have indicated at 10—10', adjacent portions of two drums, said drums having on the outer wall thereof, circumferential rings 11—11', which in the construction shown, are of I-cross-sectional form. These rings are generally referred to as "T-rings," in that the outer portions of the rings are of T-cross-sectional form, or in other words, have the upwardly and downwardly extending flanges 12—12' and 13—13' respectively. These rings are welded or otherwise secured to the drums and at least two rings are usually employed vertically on the drums, and it is preferred that the clamps in question be coupled with the uppermost rings, it being understood in this connection that the drums are nested on the deck of a ship in upright position, and the upper rings will be readily accessible for attachment of the clamp.

My improved clamp comprises a pair of similar clamp plates 14—14', and to simplify this description, the plate 14 only will be described. However, primed references will be utilized on the associated plate in designating like parts.

The plate 14 is generally of the contour seen in Fig. 1, as viewed in plan, and terminates in flared ends 15, which are joined centrally in a contracted portion 16. In other words, the plate conforms with the general contour of adjacent portions of the drums or the rings 11—11' thereof. Outer side edges of the plate have raised flanges 17 and 18, inwardly of which are raised channel portions 19 and 20, which converge centrally of the plate in a single channel portion 21.

Considering the cross-sectional views of the plates, as seen in Figs. 2 to 4 inclusive, it will appear that the walls 22 of the plates between the flanges and the raised channels are offset outwardly with respect to the walls 23, which are disposed between the channel portions 19 and 20 at the outer ends 15 of the plate. In other words, the walls 23—23' of the pair of plates abut between the rings, whereas the walls 22—22' are spaced apart by the rings. It will also be noted, from a consideration of the cross-sectional views, that clearance will be provided in the channels for the flanges 12—12' and 13—13' of the rings. This clearance is provided to compensate for any slight irregularities that may prevail in the ring or the flanges thereof.

The walls 23—23' are generally triangular in form, as will clearly appear in Fig. 1 of the drawing, and these walls have, at their outer ends, upstanding substantially U-shaped bearing portions 24 for reception of coupling bolts 25. The outer ends of the bearings 24 have at opposed walls, recesses 26 for reception of the cross-head 27 of the bolt 25. In the construction shown, the cross-head 27 is arranged in the recesses 26' of the bearings 24'. However, the bearings of both plates will be similarly formed in order to simplify production of the plates. In other words, making a single plate which is used in pairs in making-up the clamp.

In mounting the cross-head 27 of the bolt 25 in the plate 14', the bearing 24' of this plate is notched and apertured, as seen at 28, Fig. 5 of the drawing, to receive a projecting tongue 29 on a bolt retaining member 30, note Fig. 6. The member 30 has a pair of semi-circular straps 31 for encircling the projecting part of the cross-head 27 at the sides thereof, the straps terminating in straight apertured ends 32 which are secured by screws or other means 33, to the bearings, so as to hold the cross-head 27 against accidental displacement from the plate 14'. On the threaded portion of the bolt 25 is disposed a clamp nut 34 which operates upon a washer 35 seating upon the upper end of the bearing 24. The outer ends of the walls of the bearings 24—24' are preferably rounded, as seen at 36—36', to facilitate free swinging of the bolt into the clamping and unclamping positions when the nut 34 is loosened sufficiently to clear the washer 35 over the rounded end 36. By reason of this construction, it will appear that the nut or washer is always retained upon the bolt and a minimum amount of action is required to place the plates in secured position. In the above description, reference has been made to the single bolt and its associated parts, but it will be understood that both bolts are of the same construction and two of the members 30 are employed, one for retaining each bolt in connection with the bearing portions 24' of the plate 14'.

In the use of the clamp, the bolts 25 at the ends of the plate 14' are moved into a substantially horizontal position, being frictionally held in this position by the members 30, and this plate, in an edgewise position is passed between the two drums, then turned and moved into engagement with the lower flanges 13—13' of the rings 11—11', after which the upper plate 14 is simply placed in position above the lower plate 14', then the bolts 25 are swung upwardly through the open bearings 24—24' and the nuts are moved into clamping position.

By utilizing automatically actuated nut tightening devices, the nuts may be quickly moved into clamping position and the entire operation performed in a minimum amount of time. The clamp plates will provide a strong and secure coupling between adjacent drums, positively retaining the same against relative shifting or movement, at least to any appreciable or noticeable degree. It will also be understood that when the clamps are not in use, the pairs of clamp plates can be tentatively coupled together by retaining the same in the operative position, as shown, particularly when it is understood that the plates are quickly detachable for assemblage at any time.

While I have shown plates of a specific structure, it will be understood that the distinctive feature in the clamp plate structure resides in the provision of grooves or channels on adjacent surfaces of a pair of plates, which grooves or channels converge and intersect centrally of the plates, the plates having means to retain the same in assembled relationship. In connection with this latter, the important thing is that the plates are firmly coupled together. It will also be understood that the clamps may be utilized in binding or tying together a number of cargo units of any type or kind having flanged bands which lend themselves for coupling engagement by the use of plates of the kind under consideration.

Having fully described my invention, what I claim as new and desire to secure by Letters Patent is:

1. A clamp for securing a pair of ringed drums against relative movement, said drums having rings, the outer ends of which are of T-cross-sectional form, said clamp comprising a pair of substantially similar plates, adjacent surfaces of the plates having curved grooves diverging at the ends of the plates and converging into a single groove centrally of the plates, the grooves of said plates being adapted to receive the T-ends of said rings, said plates having bolt receiving apertures opening outwardly through the ends of the plates, bolts arranged in said apertures for securing the plates together, said bolts having cross-head ends at one end, means coupling the cross-head ends of the bolts with one of the plates to allow said bolts to swing through said apertures from an operative to an inoperative position, said last named means comprising straps, and each strap having a pair of bearing portions engaging the cross-head of a bolt.

2. A clamp of the class described comprising a pair of plates having flanged sides, diverging channels at end portions of the plates inwardly of and spaced from said flanges, said channels converging in a single channel centrally of the plate, the end portion of each plate inwardly of the channels having offset abutting bearing portions opening outwardly through the ends of the plate, bolts mounted in said bearing portions for coupling the plates together, means pivotally supporting one end of the bolts in connection with the bearings of one plate, and said last named means comprising straps detachable with the bearing portions of said plate.

3. A clamp of the class described comprising a pair of plates having flanged sides, diverging channels at end portions of the plates inwardly of and spaced from said flanges, said channels converging in a single channel centrally of the plate, the end portion of each plate inwardly of the channels having offset abutting bearing portions opening outwardly through the ends of the plate, bolts mounted in said bearing portions for coupling the plates together, means pivotally supporting one end of the bolts in connection with the bearings of one plate, said last named means comprising straps detachable with the bearing portions of said plate, and the walls defining said flanged sides being disposed in spaced relation to each other when the plates are coupled together.

JACK G. IMPARATO.

REFERENCES CITED

The following references are of record in the file of this patent:

UNITED STATES PATENTS

| Number | Name | Date |
| --- | --- | --- |
| 550,094 | Blundell | Nov. 19, 1895 |
| 863,160 | Dewein | Aug. 13, 1907 |
| 2,384,112 | Meyer | Sept. 4, 1945 |

FOREIGN PATENTS

| Number | Country | Date |
| --- | --- | --- |
| 182,378 | Great Britain | July 6, 1922 |